Nov. 4, 1958     M. E. JOHNSON     2,858,602
METHOD OF MANUFACTURING A COMBINED
BEARING AND OPERATIVE MEMBER
Filed Sept. 1, 1954
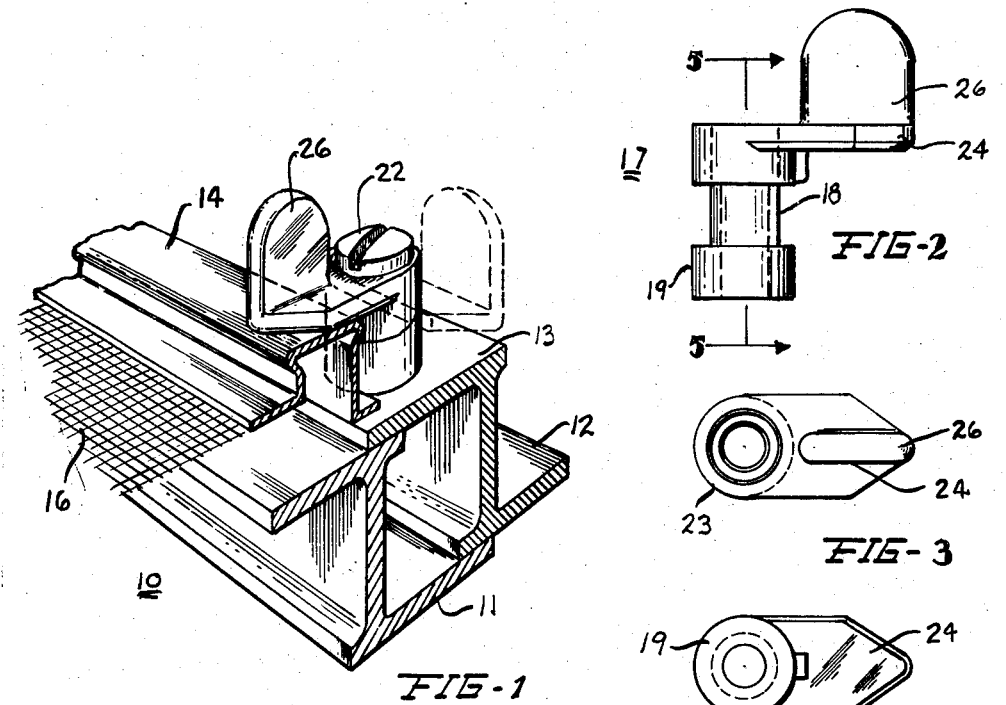
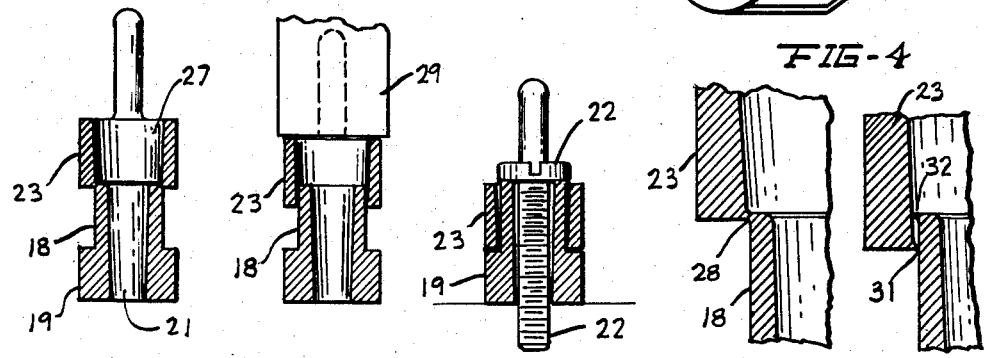
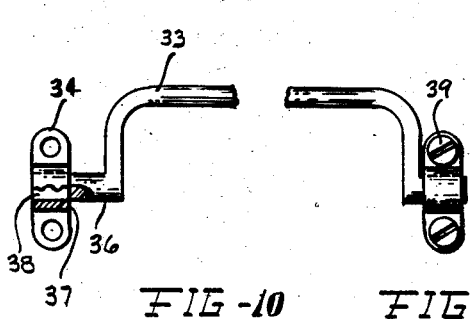
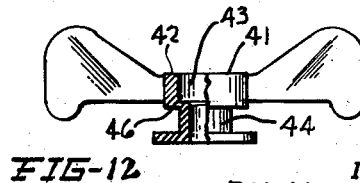
INVENTOR.
Milton E. Johnson
BY
Richmond A. Hays
ATTORNEY United States Patent Office 2,858,602
Patented Nov. 4, 1958

2,858,602

METHOD OF MANUFACTURING A COMBINED BEARING AND OPERATIVE MEMBER

Milton E. Johnson, Jamestown, N. Y., assignor to Falconer Metal Specialties Co., Inc., Jamestown, N. Y., a corporation of New York Application September 1, 1954, Serial No. 453,654

2 Claims. (Cl. 29—413)

This invention relates to the method of manufacturing a combined bearing and operative member.

It has always been difficult to economically produce various small latches, fasteners, and other operative members used in the securing or mounting of windows, screens, etc., or in the mounting and securing of swingable or rotatable handles. Such structures, to avoid expense, are frequently poorly constructed, difficult to operate and, at best, of uncertain operative value. In instances where a fastener or latch is required to rotate about a pivot, operation is difficult because of a lack of proper or even adequate bearing surfaces. In instances where a bearing, such, for example, as a sleeve, is provided, the parts frequently do not assemble well and provision of a sleeve aids only to a limited extent in the ease of operation of the parts. Furthermore, relatively small parts, of the class to which the present invention relates, require certain fitting or matching relationship in order to be operable and these parts are difficult to package and dispense with the correct number of related parts. Of course, it is possible to produce relatively rotatable and axially movable parts of this nature that will function in their intended manner. However, the cost of so doing does not warrant it, inasmuch as such parts are manufactured in very large quantities and must be distributed and sold at an extremely low price.

The present invention provides an article that is manufactured as a single element, packaged and sold as such and, preferably at the time and place of use, readily separated into two parts. These parts, by reason of their design, cooperate to provide an inner post and an enclosing sleeve. The post may be hollow or solid as the type and use to which the articles is to be put requires. The sleeve is rotatable about the post and is also movable in an axial direction with respect thereto. At the time of separation of the element into two parts, inwardly and outwardly directed rims are produced which serve to prevent separation of the parts in one axial direction. Either the sleeve or the post may include a finger grip, knob, or other manipulatable part in the form of a latch bar, rotatable bolt, handle, etc.

It is a purpose and object of the present invention to produce, as a single element, parts that, when separated as intended, are capable of both rotatable and axial relative movement.

It is another object of the invention to produce a pair of members, at least one of which takes the form of a sleeve, that have a relatively small integral bond or connection which, when broken by application of an endwise clamping force, become capable of relative rotatable and axial movement.

A further object of the invention lies in the manufacture, as a single element, of a rotatable latching or holding clip and supporting post.

A still further object of the invention lies in the provision of manufacturing a single element in the form of sleeves of stepped diameters, the integral bond at each step being relatively thin and capable of being broken by endwise clamping to produce telescoping relatively rotatable parts.

It is, of course, an important object of the invention to provide a pair of members capable of relative rotatable and axial movement by means of producing, in integral form, a pair of members of predetermined proportions and breaking the bond therebetween to produce members having useful relatively operative value.

Other objects and advantages of the invention will be more fully understood from a consideration of the following specification, taken in conjunction with the accompanying drawing, in which—

Fig. 1 is a fragmentary perspective view of a casement window and screen and shows one application of use of the invention in the form of a latching clip by which to secure the screen to the window;

Fig. 2 is a side elevational view of the clip shown in Fig. 1, prior to being separated into two parts and to mounting;

Fig. 3 is a top plan view of the clip;

Fig. 4 is a bottom plan view of the clip;

Fig. 5 is a vertical sectional view, taken substantially on the line 5—5 of Fig. 2, and shows the integral bond or connection between the parts of the clip;

Fig. 6 is a view similar to Fig. 5 and shows the relation of the parts of the clip following severance of the integral connection, one part being partially telescoped with the other part;

Fig. 7 is a view similar to Fig. 6 and shows the separated parts fully telescoped and with a securing screw in place, this being substantially a vertical sectional view of the structure as depicted in Fig. 1;

Fig. 8 is an enlarged fragmentary vertical sectional view showing in detail the integral bond or connection between the parts of the clip, this being similar to the showing in Fig. 5;

Fig. 9 is a view similar to Fig. 8 and shows the lateral annular flanges or rims produced at the place of severance of the parts and by which the sleeves are prevented axial separation in one direction (see Fig. 6);

Fig. 10 is a fragmentary front elevational view, partly in section, of the invention, utilized as a mounting for a drawer handle, the parts being shown prior to severance;

Fig. 11 is a reverse view of the structure of Fig. 10 and shows the parts in operative position following severance; and Fig. 12 is a side elevational view, partly in section, of the application of the invention to another type of latch or fastener.

Referring more particularly to the drawing, the reference numeral 10 is employed to generally designate a portion of a casement window which is utilized to depict one use of the present invention. The window 10 comprises a sash 11 and frame 12. The inner flange 13 of the frame provides a surface against which an edge of the channel 14 of a screen 16 abuts. The invention as illustrated, in operation, serves to releasably secure the screen 16 to the casement frame 12.

The invention is shown in three forms; namely, the form illustrated in Figs. 1 to 9, inclusive, the form in Figs. 10 and 11, and the form in Fig. 12. Each form discloses the inventive concept of forming, by die casting or other comparable method, an element that can, by the simple expedient of the application of a clamping force, be made into two members that cooperate to serve a useful purpose. In the first disclosure of the invention, it is shown as a latching clip for a screen on a casement window. In the disclosure of Figs. 10 and 11, the invention illustrates how a swingable drawer pull may be made in one part and, subsequently, through the application of clamping pressure, be changed into three parts; namely, a bail or handle and mounting bearings. The form shown in Fig. 12 illustrates application of the invention to the more or less conventional storm sash fastener. In this instance, however, the wing latch is carried on a suitable bearing and would appear to be superior to the latch it proposes to displace by reason of the provision of the sleeve-like bearing.

Attention is now particularly directed to the first form of the invention wherein a latching clip, generally designated by the numeral 17, is shown. This clip consists of a post 18 having an annular collar 19 at one end. An aperture 21, through the post, serves, at the time of installation, to receive a screw 22. The upper end of the clip takes the form of a sleeve 23. A flange or lug 24 extends horizontally from the upper edge of the sleeve. This lug constitutes a swingable latching or holding bar for the clip. In order to operate this bar, an upstanding finger grip 26 is provided. The sleeve 23 is formed with an opening 27 that is of slightly greater diameter at its upper end. The outer diameter of the post 18 is slightly less than the diameter of the opening 27 at the lower end of the sleeve. The post and sleeve are formed integral by a thin, relatively minute, annular flange 28. When the clip is formed, it is a single element or part by reason of the integral connection of the post with the sleeve through the flange 28. The integral connection between the parts is sufficiently rugged to permit the single-part clip to be finish-processed, such as by polishing or in any other fashion that may be required. The clip may be packaged, distributed, and sold as a single part or element.

To ready the clip for use, it must, of course, first be converted into two cooperative parts; namely, a hollow supporting shaft and operating sleeve. This may be accomplished in any of several ways. For example, a clamping pressure applied to the bottom surface of the collar 19 and the top of the sleeve 23, such, for example, as through the use of a pair of suitable pliers, would break the flange 28 in the desired manner. As suggested in Fig. 6, the clip could be placed on a hard surface and a tool 29 applied to the upper edge of the sleeve 23. One or two taps on the tool 29 will break the integral bond formed by the flange 28 and produce the two parts shown in this figure. It is also possible to locate the clip over the threaded opening in the window frame 12, insert screw 22, and merely tap the head of the screw to sever the flange 28. Regardless of how the flange 28 may be severed to change the single element into two cooperative parts, the result will always be to create an inwardly extending annular rim 31 in the sleeve and an outwardly extending annular rim 32 on the post. It is believed this is clearly illustrated in Figs. 6 and 9 of the drawing. The clip 17 as shown, when transformed into two parts, automatically provides means by which to prevent complete separation of these parts. Obviously, the smaller diametered portion 18 of the post can move into the opening 27 of the sleeve only to an extent determined by the collar 19. Similarly, the post 18 cannot be fully withdrawn from the sleeve due to contact of the annular rims 31 and 32. From this, it will be appreciated that, although the clip shown and described is formed as a single element, it is transformed into a pair of cooperative parts which, although unseparable, nevertheless, are capable of limited relative axial movement and full relative rotatable movement.

It is entirely within the scope of the invention to form the post on the manipulative part, such as shown in Fig. 2 as including the lug 24 and finger grip 26. With such a reversal of parts, the post 18 would be in the nature of a sleeve, or such as the collar 19. In this instance, the opening in the collar 19 would be tapered in the opposite direction from the taper of the opening 27 and the meeting parts would be integrally joined by a flange similar to the flange 28. Carrying this reversal of parts into practical illustration, attention is directed to the disclosure in Figs. 10 and 11. Herein, it is proposed to provide a handle 33 and mounting bracket and bearings 34 as one integral element. In this showing of the invention, the handle 33 has end mounting posts 36. The ends of these posts are integral, through small annular flanges 37, with the interior walls of the mounting brackets 34. The opening in each bracket is slightly tapered in the manner of the opening 27 and, of course, the post 36, when the flange 37 is severed, is capable of projecting into the opening 38 of the bracket. Thus, it is proposed to produce a handle, bail, or other swivelable member integral with its supports, and at time of installation, or, in fact, at any other convenient time, separate this single element into three cooperative parts. When the brackets 34 have been separated from the handle 33, they may be adjusted axially of the shafts 36 to provide desirable swing clearance for the handle and then secured to a desired surface in any manner, such as through the use of the screws 39 shown.

Attention is now directed to Fig. 12 of the drawing, wherein a further application of use of the invention is disclosed. Herein, a wing latch 41 is shown, this latch being recognizable as similar to a conventional storm sash latch. The body of the latch takes the form of a sleeve 42 and, of course, the interior opening 43 is tapered in the manner of the opening 27 above described. A hollow post 44 has integral connection with the lower edge of the sleeve through the annular flange 46. This flange is, of course, severable and when this operation has taken place, the fastener consists of two parts; namely, the supporting post and the operable winged sleeve. When the parts are severed, a screw may be inserted through the post, the head of which will bear generally against the upper end of the post. Thus, the sleeve 41 and the integral wings may be freely rotated about the post without binding and swung into and out of latching position at will.

From the foregoing, it is clear that the present invention discloses a new article of manufacture in the form of a single part or element and that through the application of a clamping pressure, the element is transformed into a pair of cooperative parts. Although the invention has been shown and described in only two forms, it being considered that the form of Figs. 2 and 12 are substantially the same, it will be understood that variations or modifications of the invention may be made and are contemplated in its application to uses other than those shown and that such modifications, as well as the means by which to produce the operative structure, are contemplated as being within the spirit and scope of the invention insofar as they are set out in the annexed claims.

Having thus set forth my invention, what I claim as new and for which I desire protection by Letters Patent is:

1. The method of producing a combined holding clip and bearing consisting in casting a sleeve-like operative member provided with a holding portion integral with one end of a hollow mounting post, the integral connection between said sleeve and post being of the nature of a thin annular flange, applying axial compression to said post and said member whereby to sever said flange and produce overlapped rims on the interior of said member and the exterior of said post, telescoping said post with said member to an extent that the rim of said post extends beyond said sleeve and mounting said post to enable rotation of said sleeve thereabout by projecting a headed member through said post with the head of said member in abutment with the rim of said post.

2. The method of producing a combined holding clip and bearing as set forth in claim 1 in which the overlapped rims formed by severing said flange prevent axial separation of said member and said post in one direction.

References Cited in the file of this patent

UNITED STATES PATENTS

| | | |
|---|---|---|
| 1,334,610 | Hope et al. | Mar. 23, 1920 |
| 1,808,318 | Pleister | June 2, 1931 |
| 2,102,230 | Waterman | Dec. 14, 1937 |
| 2,520,259 | Pummill | Aug. 29, 1950 |
| 2,707,324 | Walther | May 3, 1955 |
| 2,724,867 | Smith | Nov. 29, 1955 |